United States Patent
Wang et al.

(10) Patent No.: US 11,118,644 B2
(45) Date of Patent: Sep. 14, 2021

(54) VIBRATION-DAMPING AND NOISE-REDUCING BRAKE DISC

(71) Applicant: University of Shanghai for Science and Technology, Shanghai (CN)

(72) Inventors: Shuwen Wang, Shanghai (CN); Huan Zhang, Shanghai (CN); Xuegang Zhang, Shanghai (CN); Wang Guo, Shanghai (CN); Deyu Zhao, Shanghai (CN)

(73) Assignee: UNIVERSITY OF SHANGHAI FOR SCIENCE AND TECHNOLOGY, Shanghai (CN)

( * ) Notice: Subject to any disclaimer, the term of this patent is extended or adjusted under 35 U.S.C. 154(b) by 184 days.

(21) Appl. No.: 16/588,328

(22) Filed: Sep. 30, 2019

(65) Prior Publication Data

US 2020/0208696 A1 Jul. 2, 2020

(30) Foreign Application Priority Data

Dec. 28, 2018 (CN) .......................... 201811623806.0

(51) Int. Cl.
*F16D 65/12* (2006.01)
*B23K 26/352* (2014.01)
(Continued)

(52) U.S. Cl.
CPC .......... *F16D 65/127* (2013.01); *B23K 26/352* (2015.10); *C21D 1/09* (2013.01);
(Continued)

(58) Field of Classification Search
None
See application file for complete search history.

(56) References Cited

U.S. PATENT DOCUMENTS 10,260,585 B2 * 4/2019 Saga .................... B61H 5/00
2011/0293849 A1* 12/2011 Lembach .............. F16D 65/127
427/535

FOREIGN PATENT DOCUMENTS

| CN | 103352105 B | 7/2014 |
| CN | 103221701 B | 8/2016 |
| CN | 106949177 A | 7/2017 |

* cited by examiner

*Primary Examiner* — Colby M Hansen
(74) *Attorney, Agent, or Firm* — Tutunjian & Bitetto, P.C.

(57) ABSTRACT

The present invention discloses a vibration-damping and noise-reducing brake disc, where the vibration-damping and noise-reducing brake disc includes an intermediate disc having an outer side and a braking ring which surrounds the outer side of the intermediate disc. Two opposite surfaces of the braking ring are frictional surfaces provided with at least one laser scanning strip, where the laser scanning strip is obtained or formed by laser quenching and hardening treatments of the two frictional surfaces by a laser machine, for changing the physical and mechanical properties of the braking ring, such as the surface and inside hardness, residual stress distribution on the frictional surfaces, and the inside micro-structures of the braking ring, so as to suppress the generation of frictional vibration and noise during braking operations. The vibration-damping and noise-reducing brake disc of the present invention has stable coefficients of friction in braking operations, therefore, the occurrence of frictional noise and vibrations of the brake disc can be reduced, and the operational performance of the vehicle with such brake discs can be improved.

6 Claims, 3 Drawing Sheets

(51) Int. Cl.
*C21D 1/09* (2006.01)
*C21D 1/62* (2006.01)
*F16D 65/00* (2006.01)
*F16D 65/02* (2006.01)

(52) U.S. Cl.
CPC ........... C21D 1/62 (2013.01); F16D 65/0006 (2013.01); F16D 65/0037 (2013.01); *F16D 2065/1304* (2013.01)

VIBRATION-DAMPING AND NOISE-REDUCING BRAKE DISC

This application claims priority to Chinese application number 201811623806.0, filed Dec. 28, 2018, with a title of VIBRATION-DAMPING AND NOISE-REDUCING BRAKE DISC. The above-mentioned patent application is incorporated herein by reference in its entirety.

TECHNICAL FIELD

The present invention relates to a brake disc, and in particular to a vibration-damping and noise-reducing brake disc.

BACKGROUND

With the issue of energy conservation and environmental protection becoming the theme of social and economic development, disc brakes have been widely used in vehicle braking systems, because disc brakes have the characteristics of good heat dissipation, good braking thermal stability, low reduction in braking efficiency after water immersion, small mass and inertia, small amount of thermal expansion in thickness, and the like. However, during the braking process, the changing of friction between the brake disc and friction pads, causing the braking torque to fluctuate, which is the main cause of brake noise and vibrations. Braking vibrations cause serious problems to a braking system, such as reduce the service life of components of the braking system and affect the performance of a vehicle. At the same time, braking noise generate pollution to the surrounding environment, which has adverse effects on the human physical and psychological health. Therefore, it is important to innovate a brake disc with vibration damping and noise reduction performance. Research shows that the surface treatment of a brake disc by the laser surface quenching technology is an effective way to reduce the braking frictional vibrations and noise.

At present, most of the existing braking noise and vibration reduction methods are to optimize the structures and/or increase the damping of brake discs. For example, in the COMPOSITE DAMPING LAYER VIBRATION DAMPING SHEET FOR NOISE REDUCTION OF DISC BRAKE, the vibration damping structure of the conventional disc brake is improved by using a simple and practical polymer damping material, so that with respect to the vibration of a braking block and the like directly generating noise, the braking vibration energy loss is greatly increased by the composite damping layer, thereby achieving the goal of vibration damping and noise reduction. However, this method is complicated in structure, high cost, and difficult to be used widely. There are other solutions for vibration damping and noise reduction of brake discs by means of surface texturing. For example, a texture design of grooves and pits on the frictional surfaces of a brake disc is proposed in the CAST IRON BRAKE DISC WITH TEXTURED SURFACE CAPABLE OF REDUCING FRICTION NOISE. Although the textured brake disc generates less braking noise and have better heat dissipation, low-frequency noise is generated by the secondary vibrations of the brake disc during braking operations due to the grooves on the brake disc surfaces.

SUMMARY

The present invention is implemented to solve the above problems, and an objective thereof is to provide a vibration-damping and noise-reducing brake disc by laser surface quenching.

The present invention provides a vibration-damping and noise-reducing brake disc, characterized in that the vibration-damping and noise-reducing brake includes an intermediate disc having an outer side and a braking ring that surrounds the outer side of the intermediate disc. The two opposite surfaces of the braking ring are frictional surfaces provided with at least one laser scanning strip. The laser scanning strip is obtained or formed by laser quenching and hardening treatment of the two frictional surfaces of the brake disc, for changing the hardness and residual stress distribution on the frictional surfaces, so as to suppress the generation of frictional vibrations and noise during braking.

The vibration-damping and noise-reducing brake disc provided by the present invention may further be characterized in that the laser scanning power for the laser quenching and hardening treatment is 500-4000 W, the scanning speed is 100-1000 mm/min, and the laser spot area is 10-100 mm$^2$.

The vibration-damping and noise-reducing brake disc provided by the present invention may further be characterized in that the laser scanning strips have an annular shape and are sequentially distributed from the inside to the outside in the radial direction of the braking ring, and the center of the circle coincides with the center of the intermediate disc.

The vibration-damping and noise-reducing brake disc provided by the present invention may further be characterized in that the laser scanning strips are strip-shaped laser scanning strips extending in the radial direction of the brake ring.

The vibration-damping and noise-reducing brake disc provided by the present invention may further be characterized in that the material of the brake disc is cast iron but it also can be any other materials that can be used as brake discs.

The vibration-damping and noise-reducing brake disc provided by the present invention may further be characterized in that the brake disc can be used in vehicles but it also can be used in any other machines.

Function and Effect of the Present Invention

According to the vibration-damping and noise-reducing brake disc of the present invention, since the laser scanning strip of the frictional surfaces are substantially thin quench-hardened layers and the frictional surfaces have fine uniform micro-morphology, so that the good toughness inside the brake disc is ensured and the brake disc has a stable coefficient of friction, and the damping performance of the brake disc is also improved. Therefore, the vibration-damping and noise-reducing brake disc of the present invention can reduce the occurrence of frictional noise and vibrations of the brake disc and improve the braking performance of a vehicle or other kinds of machines.

DETAILED DESCRIPTION

In order to make the technical means and effects of the present invention easy to understand, the present invention will be specifically described below in conjunction with the embodiments and the accompanying drawings.

Embodiments

Figure 1:
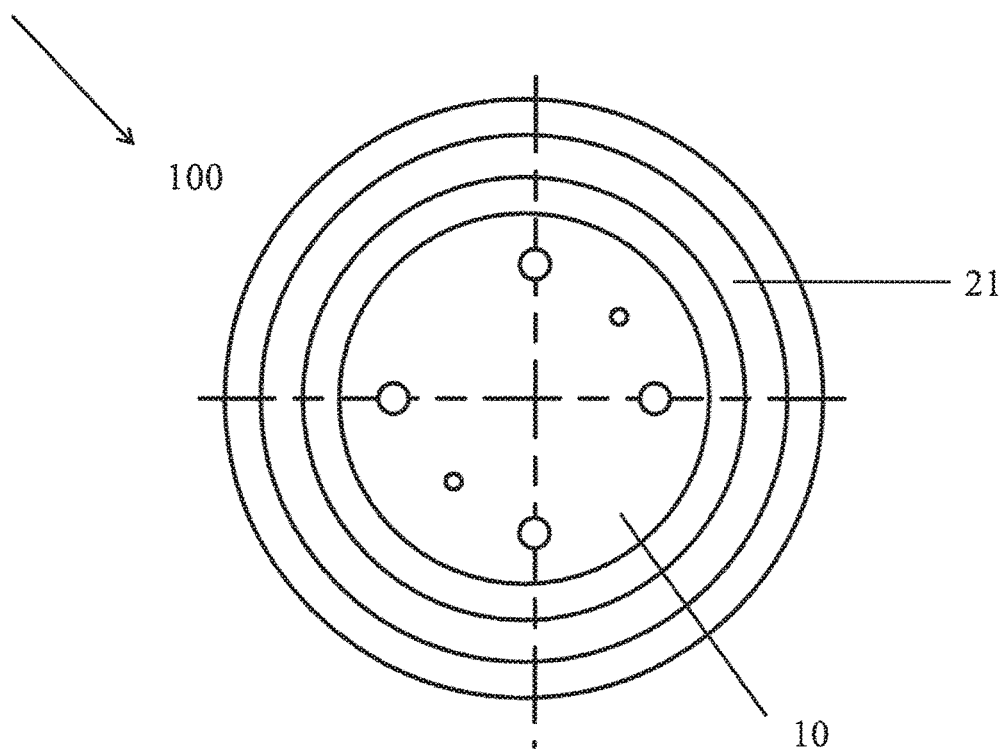
FIG. 1 is a schematic structural view of a vibration-damping and noise-reducing brake disc according to an embodiment of the present invention.
Figure 2:
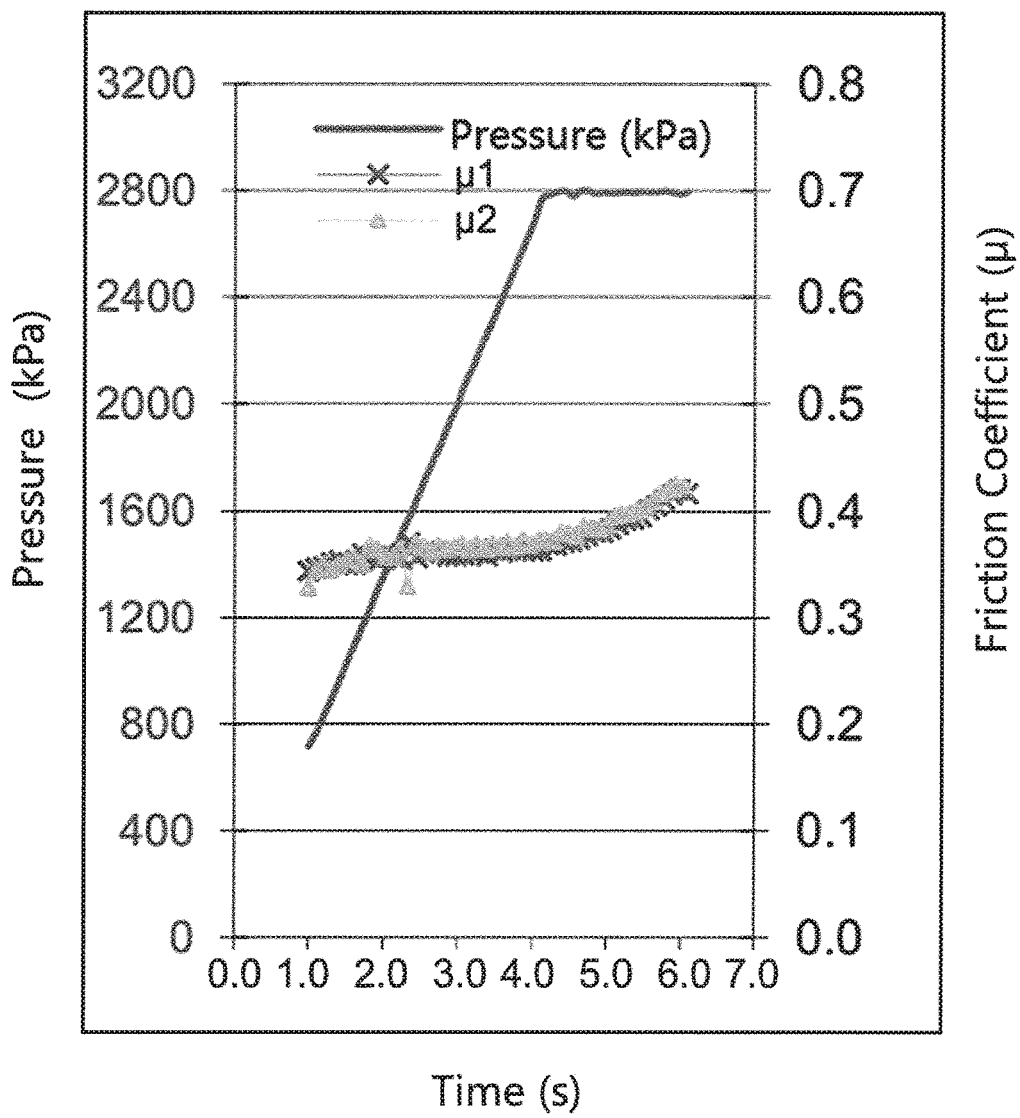
FIG. 2 is a curve chart that shows the relationship between the friction coefficient of the vibration-damping and noise-reducing brake disc and the braking pressure and time according to an embodiment of the present invention.

FIG. 1 is a schematic structural view of a vibration-damping and noise-reducing brake disc according to an embodiment of the present invention; and FIG. 2 is a birdview of the vibration-damping and noise-reducing brake disc according to an embodiment of the present invention.

As shown in FIG. 1, a vibration-damping and noise-reducing brake disc 100 of this embodiment includes an intermediate disc 10 and a brake ring 20.

The brake ring 20 surrounds the outer side of the intermediate disc 10; and two opposite surfaces of the brake ring are friction surfaces provided with at least one laser scanning strip 21.

The laser scanning strip 21 is obtained by laser quenching and hardening treatment of the two frictional surfaces, for changing the residual stress distribution on the frictional surfaces, so as to suppress the generation of frictional vibration and noise during braking.

The laser scanning power for the laser quenching and hardening treatment is 500-4000 W, the scanning speed is 100-1000 mm/min, and the laser spot area is 10-100 mm$^2$.

The laser scanning strips 21 have an annular shape and are sequentially distributed from the inside to the outside in the radial direction of the brake ring, and the center of the circle coincides with the center of the intermediate disc.

When the number of the laser scanning strips 21 is more than one, the laser scanning strips are sequentially evenly distributed or unevenly distributed from the inside to the outside in the radial direction or parallel distributed on the surfaces of the brake ring.

FIG. 2 is a curve chart, which shows that the friction coefficient of the vibration-damping and noise-reducing brake disc is varying with the braking pressure and time according to the embodiment of the present invention.

As shown in FIG. 2, when the initial braking speed is 50 km/h and the braking temperature is 150° C., the braking friction coefficient μ is kept nearly a constant value of 0.35 as the braking pressure and braking time is increasing.

The braking frictional noise tests were performed with the non-quenched brake disc and the vibration-damping and noise-reducing brake disc 100 of the embodiment. The sound pressure levels in the frequency range of 2 kHz to 16 kHz of 185 braking tests were analyzed.

Table 1 presents the occurrence numbers of large braking sound pressure levels generated by the brake disc without laser surface quenching. It can be seen from Table 1 that, over 70 dB(A) sound pressure levels are observed in 25 braking tests that accounts for 13.51% of the 185 total braking tests; over 80 dB(A) sound pressure levels are observed in 20 braking tests that accounts for 10.81% of the 185 total braking tests; over 90 dB(A) sound pressure levels are observed in 10 braking tests that accounts for 5.41% of the 185 total braking tests.

TABLE 1

Large sound pressure level of braking tests generated by the brake disc without laser surface quenching

| Frequency range | Sound pressure level dB(A) | Occurrence number | Proportion % |
|---|---|---|---|
| 2 kHz to 16 kHz | >70 | 25 | 13.51 |
| | >80 | 20 | 10.81 |
| | >90 | 10 | 5.41 |
| | >100 | 0 | 0 |
| | Total braking operations | | 185 |

Table 2 shows the occurrence numbers of large braking sound pressure levels generated by the brake disc with laser surface quenching. It is observed from Table 2 that, over 70 dB(A) sound pressure levels are observed in 7 braking tests that accounts for 3.8% of the 185 total braking tests; over 80 dB(A) sound pressure levels are observed in 4 braking tests that accounts for 2.2% of the 185 total braking tests; over 90 dB(A) sound pressure levels are observed in 1 braking test that accounts for about 0.5% of the 185 total braking tests.

TABLE 2

Large sound pressure level of braking tests generated by the brake disc with laser surface quenching

| Frequency range | Sound pressure level dB(A) | Occurrence number | Proportion % |
|---|---|---|---|
| 2 kHz to 16 kHz | >70 | 7 | 3.8 |
| | >80 | 4 | 2.2 |
| | >90 | 1 | 0.5 |
| | >100 | 0 | 0 |
| | Total braking operations | | 185 |

It can be seen from the braking noise test results shown in Table 1 and Table 2 that, the braking frictional noise has been significantly reduced by the laser quenched brake disc in this embodiment.

Figure 3:
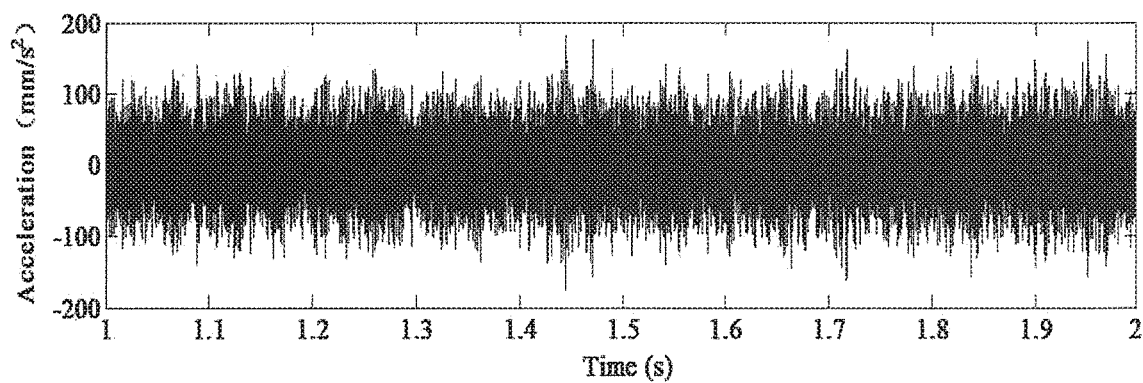
FIG. 3 is a comparison view of axial vibration signals in one cycle of braking noise tests of the brake disc without laser quenching.
Figure 4:
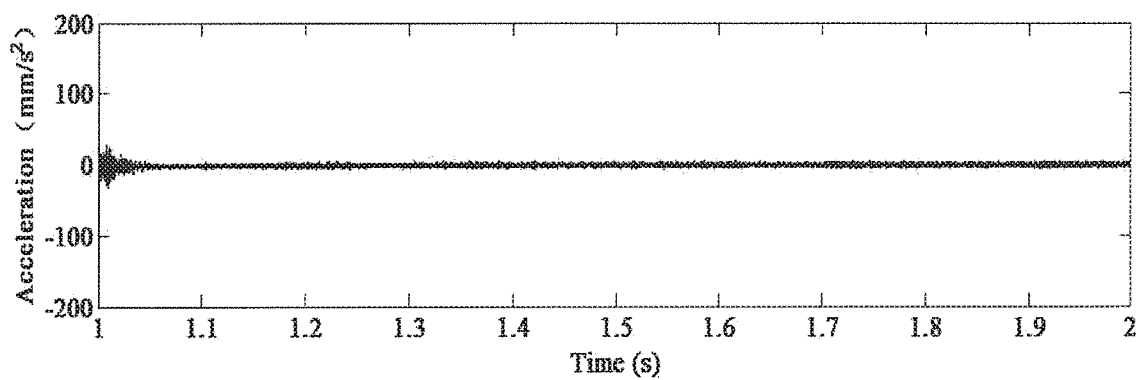
FIG. 4 is a comparison view of axial vibration signals in one cycle of braking noise tests of the brake disc after laser quenching according to an embodiment of the present invention.

FIG. 3 demonstrates the axial acceleration signals of a caliper in one operation of a braking frictional noise test generated by a brake disc without laser surface quenching; while FIG. 4 illustrates the axial acceleration signals of a caliper in one operation of a braking frictional noise test generated by the brake disc with laser surface quenching, a vibration-damping and noise-reducing brake disc according to an embodiment of the present invention.

As shown in FIG. 3 and FIG. 4, compared with the brake disc without laser surface quenching, the vibration-damping and noise-reducing brake disc 100 in the embodiment generates a much lower vibration acceleration amplitude, indicating that the vibration-damping and noise-reducing brake disc 100 in this embodiment can significantly reduce braking vibrations, and the maximum amplitude of braking vibrations of the vibration-damping and noise-reducing brake disc 100 is reduced by more than 90%.

Function and Effect of Embodiments

According to the vibration-damping and noise-reducing brake disc of the embodiment, since the laser scanning strip of the friction surface is substantially a thin quench-hardened layer, the frictional surfaces have fine uniformed micro-structures, so that the good toughness inside the brake disc is ensured and the brake disc has a stable coefficient of friction, and the damping performance of the brake disc is also improved. Therefore, the vibration-damping and noise-reducing brake disc of the present invention can reduce the occurrence of friction noise and vibration of the brake disc and improve the braking performance of a vehicle.

According to the vibration-damping and noise-reducing brake disc of the embodiment, since the frictional surfaces is subjected to laser quenching and hardening treatments, the laser scanning strip is obtained; and the laser surface treatment is convenient without modifying the structure of the brake, which is very easy to implement.

The above embodiments are preferred examples of the present invention and are not intended to limit the scope of the present invention.

For example, in the above embodiment, the laser scanning strips have an annular shape, and the center of the laser scanning strips coincide with the center of the intermediate disc and the laser scanning strips are sequentially distributed from the inside to the outside in the radial direction of the braking ring, thereby ensuring good toughness inside the brake disc while making it have a stable friction coefficient, and improving its damping performance; in the present invention, the laser scanning strips may also be strip-shaped laser scanning strips extending in the radial direction of the braking surfaces or parallel distributed on the braking surfaces, which can also ensure good toughness inside the brake disc while making it have stable friction coefficients, and improving its damping performance of the brake disc.

What is claimed is:

1. A vibration-damping and noise-reducing brake disc, comprising:
   an intermediate disc having an outer side; and
   a braking ring surrounding the outer side of the intermediate disc and having two opposite frictional surfaces each provided with at least one laser scanning strip, the laser scanning strip being formed by laser quenching and hardening treatments of the two frictional surfaces by a laser, for changing a residual stress distribution on the frictional surfaces and inside micro-structures of the braking ring, so as to suppress the generation of frictional vibrations and noise during braking operations.

2. The vibration-damping and noise-reducing brake disc according to claim 1, wherein the laser for quenching and hardening treatments has a laser scanning power in a range of 500-4000 W, a scanning speed in a range of 100-1000 mm/min, and a laser spot area in a range of 10-100 $mm^2$.

3. The vibration-damping and noise-reducing brake disc according to claim 1, wherein
   the laser scanning strips comprise an annular shape and are sequentially distributed from the inside to the outside in the radial direction of the braking ring, and a center of the laser scanning strips coincides with a center of the intermediate disc.

4. The vibration-damping and noise-reducing brake disc according to claim 1, wherein
   the laser scanning strip is strip-shaped laser scanning strips extending in the radial direction or parallel distributed on the surfaces of the braking ring.

5. The vibration-damping and noise-reducing brake disc according to claim 1, wherein
   a material of the brake disc comprises cast iron and can also be any other materials that can be used as brake discs.

6. The vibration-damping and noise-reducing brake disc according to claim 1, wherein
   the brake disc is used in vehicles and can also be used in any other machines and equipment.

* * * * *